United States Patent [19]

Waters et al.

[11] Patent Number: 4,884,336

[45] Date of Patent: Dec. 5, 1989

[54] METHOD AND APPARATUS FOR MOUNTING ELECTRICAL CONNECTORS TO PRINTED CIRCUIT BOARDS

[75] Inventors: Mark H. Waters, Harrisburg; Robert N. Whiteman, Jr., Middletown, both of Pa.

[73] Assignee: AMP Incorporated, Harrisburg, Pa.

[21] Appl. No.: 99,567

[22] Filed: Sep. 22, 1987

[51] Int. Cl.[4] .......................... H01R 9/16; B23P 19/00

[52] U.S. Cl. .......................................... 29/845; 29/739; 29/741; 29/758; 29/764

[58] Field of Search ................. 29/838, 845, 747, 758, 29/764, 762, 739, 741; 72/393; 227/55

[56] References Cited

U.S. PATENT DOCUMENTS

| | | | |
|---|---|---|---|
| 3,197,849 | 8/1965 | Johnson | 29/747 |
| 3,802,049 | 4/1974 | Hennessey, Jr. | 29/764 |
| 3,896,535 | 7/1975 | Tucci | 29/747 |
| 3,903,577 | 9/1975 | Phillips | 29/764 |
| 4,187,605 | 2/1980 | Selvin et al. | 29/838 |
| 4,196,509 | 8/1980 | Del Rico | 29/845 X |
| 4,533,075 | 8/1985 | Hallock et al. . | |
| 4,631,815 | 12/1986 | Bocchicchio et al. . | |
| 4,715,112 | 12/1987 | Jackson | 29/739 |
| 4,750,261 | 6/1988 | Letsch | 29/739 |

OTHER PUBLICATIONS

U.S. Patent Application Ser. No. 876,017, filed Jun. 19, 1986, "Electrical Connector for Easy Assembly Onto a Circuit Board and Eyelets Therefor".

U.S. Patent Application Ser. No. 944,058, filed Dec. 10, 1986, "Pick-Up Head".

*Primary Examiner*—Carl J. Arbes

*Attorney, Agent, or Firm*—David L. Smith

[57] ABSTRACT

A method for mounting an electrical connector (10) to a printed circuit board or other support panel (12) with a top-actuated eyelet (20), and an actuation tool (50, 100) for use in practicing the method. The method comprises essentially a two-step mounting process whereby the actuating tool (50, 100) first grips and restrains the connector (10), and thereafter the connector (10) is positioned relative to a printed circuit board (13) and the tool (50, 100) operated to actuate the eyelet (20) to attach the connector (10) to the board (12). The method of the invention permits the eyelet (20) to be used to facilitate positioning of the connector (10) on the printed circuit board (12) and, in general, the method and actuating tool (50, 100) permit connectors (10) to be mounted to printed circuit boards (12) in an efficient, automated manner utilizing less complex and less costly tooling.

21 Claims, 4 Drawing Sheets

METHOD AND APPARATUS FOR MOUNTING ELECTRICAL CONNECTORS TO PRINTED CIRCUIT BOARDS

BACKGROUND OF THE INVENTION

The present invention relates generally to electrical connectors, and more particularly to a method for mounting electrical connectors to printed circuit boards with top-actuated eyelets and to an actuation tool for use in practicing the method.

In many electrical applications, it is necessary to mount one or more electrical connectors to a printed circuit board or other support panel. Typically, mounting is accomplished by extending suitable fasteners such as rivets or threaded screws through aligned apertures in the connector and the board.

Most traditional mounting means are not fully satisfactory in today's electronic industry with its increasingly higher assembly rates and greater miniaturization. Riveting systems, for example, require tooling both above and below the printed circuit board which must operate in precise coordination. Such tooling tends to be complex in design, costly to manufacture and difficult to operate in a reliable manner. Riveting systems also generally require the application of rather substantial forces during mounting which can damage the connector and/or the printed circuit board. The substantial forces required by riveting systems also cannot usually be achieved by robotic systems which are being used to an increasingly greater extent in the manufacture and assembly of electrical connectors.

Mounting systems which employ threaded fasteners are also not fully satisfactory as they generally require the use of expensive tooling as well as manipulation of the connector housing. Threaded fasteners are also usually not amenable to high speed, automated assembly procedures.

It is also known to mount electrical connectors to printed circuit boards by means of top-actuated eyelets. In such systems, an eyelet is extended through aligned apertures in a connector and a printed circuit board such that the bottom end of the eyelet extends outwardly beyond the back surface of the board. An actuation tool is then inserted into the eyelet from the top end thereof to deform the bottom end of the eyelet radially outwardly to attach the connector to the board.

Known mounting systems incorporating top-actuated eyelets are also not fully satisfactory. In many systems the actuation tool applies substantial vertical forces to the assembly during actuation of the eyelet which can cause the printed circuit board to bend or break unless properly supported from below. As indicated above, the use of support tooling below the printed circuit board is undesirable as it increases both the cost and complexity of the tooling. Also, mounting systems utilizing top-actuated eyelets usually require that the components be manufactured to fairly close tolerances to ensure proper alignment of the apertures in the connector and the board and proper positioning of the eyelets in the aligned apertures. The tolerance requirements of many systems render them unsuitable for assembly by robotic means and significantly increases manufacturing costs. In addition, some prior systems included a pneumatic gun-type actuation tool which was susceptible to being accidentally triggered such that an eyelet could become a dangerous projectile causing unintended injury to nearby persons or objects.

SUMMARY OF THE INVENTION

The present invention relates to a method for mounting electrical connectors to printed circuit boards or other support panels with top-actuated eyelets, and to an actuation tool suitable for use in practicing the method. The method according to the invention comprises the steps of providing an electrical connector having a top-actuated eyelet extending through an aperture in the connector, the eyelet having a bottom portion which extends outwardly of the aperture and an internal bore extending into the eyelet from the top end thereof; inserting an actuation tool into the internal bore of the eyelet, the actuation tool including an eyelet gripping member and an eyelet actuating member; operating the eyelet gripping member for gripping the sidewall of the eyelet for restraining the eyelet and the connector; positioning the connector relative to a printed circuit board or other support panel such that the extended bottom portion of the eyelet extends through an aligned aperture in the printed circuit board or other support panel; and operating the eyelet actuating member for expanding the extended bottom portion of the eyelet outwardly to attach the connector to the printed circuit board.

The method of the present invention comprises essentially a two-step mounting process in which the actuation tool first grips and restrains the connector and, thereafter, the restrained connector is positioned on a printed circuit board and the tool is operated to actuate the eyelet to attach the connector to the board. This two-step process permits the extended bottom portion of the eyelet to be used as a guide to facilitate positioning of the connector relative to the board, making the system more amenable to high speed, automated assembly procedures. The bottom portion of the eyelet is also preferably of tapered configuration to further assist in guiding the eyelet into the connector aperture and into the aperture in the printed circuit board and to permit a relaxation of tolerance requirements for the connector and the board.

In accordance with a presently preferred embodiment of the invention, the eyelet actuating member of the actuation tool comprises an actuating plunger movable axially within the tool, and the eyelet gripping member comprises a radially expandable collet surrounding the plunger. To secure a connector to a printed circuit board, the actuation tool is inserted into the eyelet bore with the actuating plunger in a retracted position to permit the tool to be easily inserted into the eyelet. The actuating plunger is then moved forwardly within the bore to a first, partially extended position during which an external tapered surface on the plunger engages an internal tapered surface on the collet causing the collet to expand radially outwardly to firmly grip the sidewall of the eyelet to restrain the eyelet and the connector. The restrained connector is then positioned on a printed circuit board with the extended bottom portion of the eyelet extending through an aligned aperture in the printed circuit board, and the actuating plunger is thereafter moved forwardly to a second, fully extended position to push against the bottom end of the eyelet causing the extended bottom portion thereof to expand radially outwardly to attach the connector to the printed circuit board.

The actuation tool is designed such that the collet continues to securely grip the sidewall of the eyelet during actuation of the eyelet by the actuating plunger. Accordingly, the actuation tool absorbs substantially all the vertical forces required to attach the connector to the printed circuit board permitting the connector to be mounted to the board without providing support tooling beneath the board. The actuation tool of the invention thus permits a simplification of the overall tooling system and more reliable system operation.

The mounting method of the invention is particularly suitable for use in robotic systems by mounting the actuation tool to the end of a robotic arm. Alternatively, the tool can be designed as a hand-held, manually operated tool for appropriate applications.

Further advantages and specific details of the invention will become apparent hereinafter in conjunction with the following detailed description of presently preferred embodiments.

DETAILED DESCRIPTION OF THE PREFERRED EMBODIMENTS

Figure 1:
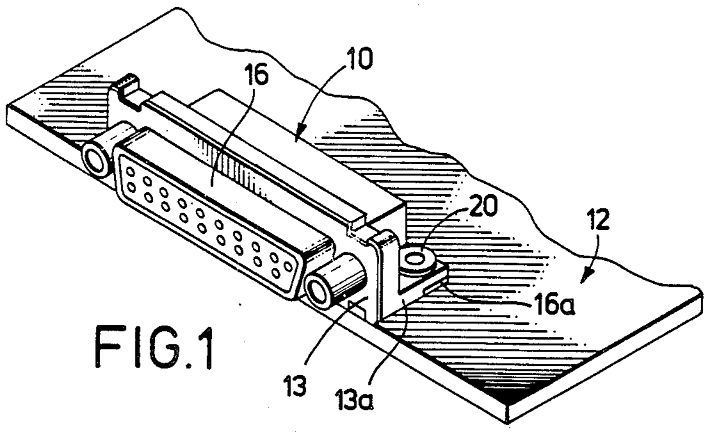
FIG. 1 is a perspective view of an assembly comprising an electrical connector mounted to a printed circuit board.

FIG. 1 illustrates an assembly comprising an electrical connector 10 mounted to a printed circuit board or other support panel 12. In the embodiment illustrated and described herein, connector 10 comprises a right angle D-connector, although it should be understood that this is intended to be exemplary only as connector lO can take numerous forms. Connector 10 comprises a housing 13 of plastic or other electrically nonconductive, material having mounting portions 13*a* formed thereon. Mounting portions 13*a* include apertures 14 extending therethrough (see FIGS. 2 and 10) which are adapted to receive top-actuated eyelets 20 for mounting connector 10 to printed circuit board 12 as will be explained hereinafter.

In the illustrated embodiment, connector 10 also includes a shield 16 having straps 16*a* which are adapted to be electrically coupled to eyelets 20 to provide a grounding path through the connector to conductive paths on the printed circuit board as is known to those skilled in the art.

Figure 2:
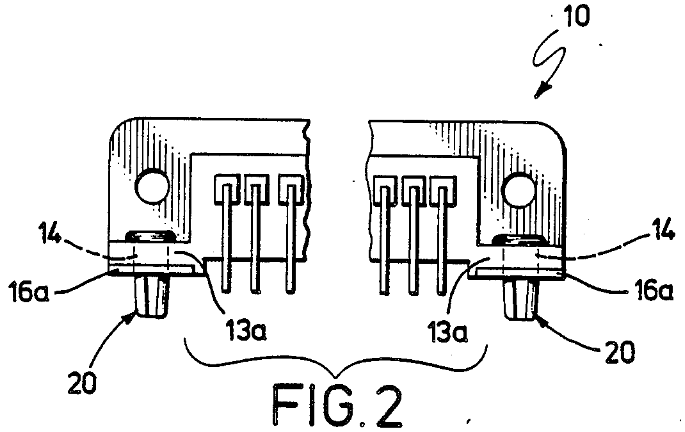
FIG. 2 is a back view of the connector of FIG. 1 prior to being mounted to a printed circuit board.
Figure 3:
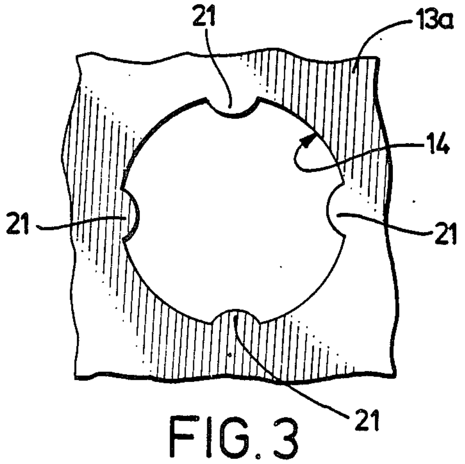
FIG. 3 is a top view of a portion of the connector of FIGS. 1 and 2 illustrating a feature of an eyelet-receiving aperture of the connector.

As best shown in FIG. 2, an eyelet 20 is adapted to extend into and through each of a pair of spaced apertures 14 in connector housing 13. Preferably, the eyelets are received within apertures 14 with an interference fit so as to prevent the eyelets from accidentally falling out of the apertures prior to mounting the connector to a printed circuit board. The interference fit can be provided in several ways, and in the embodiment illustrated, comprises a plurality of inwardly extending projections 21 around the circumference of each aperture as shown in FIG. 3. Projections 21 retain the eyelets within the connector apertures so that the connectors may be conveniently pre-assembled with the eyelets positioned therein, and shipped and stored in pre-assembled form for subsequent mounting to a printed circuit board.

Figure 4:
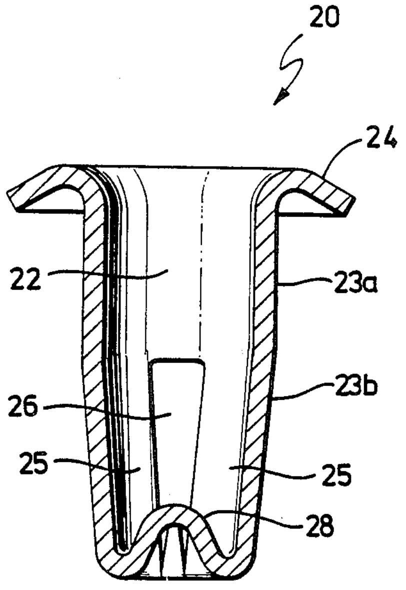
FIG. 4 is a cross-sectional view of a top-actuated eyelet incorporated in the assembly of FIGS. 1 and 2.

A top-actuated eyelet 20 is illustrated in greater detail in FIG. 4. Eyelet 20 comprises an elongated, generally cup-shaped member formed of brass or other suitable ductile, electrically conductive material. Eyelet 20 has an internal bore 22 extending axially thereinto from the top end thereof. Eyelet 20 comprises a generally cylindrical top portion 23*a* and a generally inwardly tapered bottom portion 23*b*. A flange or rim 24 extends radially outward from the top end of eyelet 20.

Tapered portion 23*b* of eyelet 20 is provided with a plurality of longitudinal segments 25, for example, three segments, formed by cutting a plurality of longitudinal slots 26 therein. As will be explained hereinafter, the slotted configuration of tapered eyelet portion 23*b* permits the portion to be splayed outwardly when the eyelet is actuated to attach connector 10 to printed circuit board 12. The bottom end of eyelet 20 is further formed to include an inverted end or a domed portion 28 which extends upwardly into bore 22.

A top-actuated eyelet 20 suitable for use in accordance with the present invention is described in greater detail in commonly assigned, co-pending U.S. patent application Ser. No. 06/876,017 filed June 9, 1986, and now is U.S. Pat. No. 4,717,219, issued Jan. 5, 1988 and entitled "ELECTRICAL CONNECTOR AND ASSEMBLY EYELETS, which application is hereby incorporated by reference.

Figure 6:
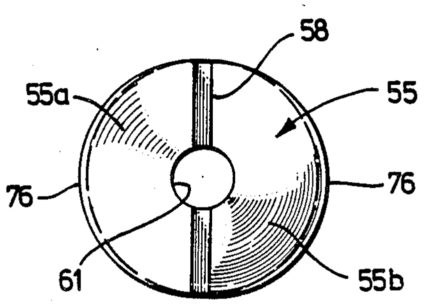
FIG. 6 is a front-end view of the collet in the actuation tool of FIG. 5.
Figure 5:
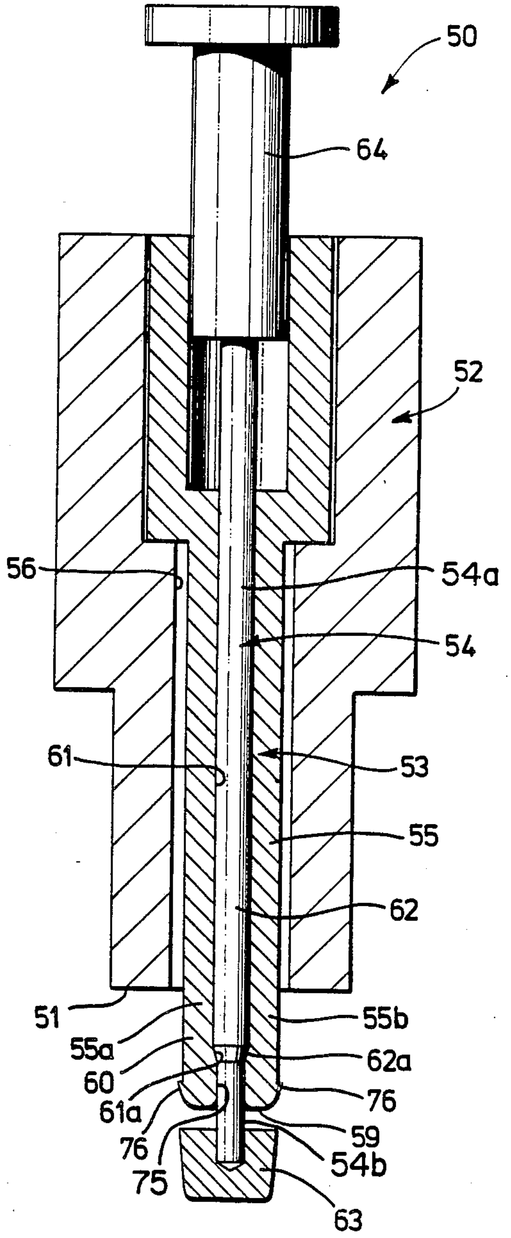
FIG. 5 schematically illustrates an actuation tool for mounting the connector of FIGS. 1 and 2 to a printed circuit board.

FIG. 5 schematically illustrates an actuation tool according to the present invention for actuating eyelets 20 for mounting connector 10 to printed circuit board 12. The actuation tool is generally designated by reference numeral 50 and includes an outer housing or holder 52, an expandable collet 53 and an actuating plunger 54. Holder 52 comprises a generally tubular-shaped member having a passageway 56 extending axially therethrough. Expandable collet 53 is supported within passageway 56 and includes an elongated, generally cylindrical-shaped forward portion 55 which, as shown in FIG. 6, has a slot 58 extending diametrically across the portion and extending rearwardly from the front end 59 thereof for a substantial portion of its length. As will be explained hereinafter, slot 58 forms forward portion 55 of collet 53 into two sections 55*a* and 55*b* of generally semi-circular cross-section which are radially expandable with respect to one another. The front end 60 of portion 55 of collet 53 extends forwardly of the front end 51 of holder 52 as shown in FIG. 5.

Collet 53 also includes a passageway 61 extending axially therethrough for receiving actuating plunger 54.

Passageway 61 includes an internal tapered surface portion 61*a*.

Activating plunger 54 comprises an elongated shaft 62 having an enlarged head 63 attached to the front end thereof and positioned forwardly of front end 59 of collet 53, and an enlarged piston or handle portion 64 at the rear end thereof and extending rearwardly of holder 52. Elongated shaft 62 includes an eternal tapered surface portion 62*a* which is adapted to cooperate with internal surface portion 61*a* of collet passageway 61 during operation of tool 50 to mount connector !0 to printed circuit board 12.

Figure 9:
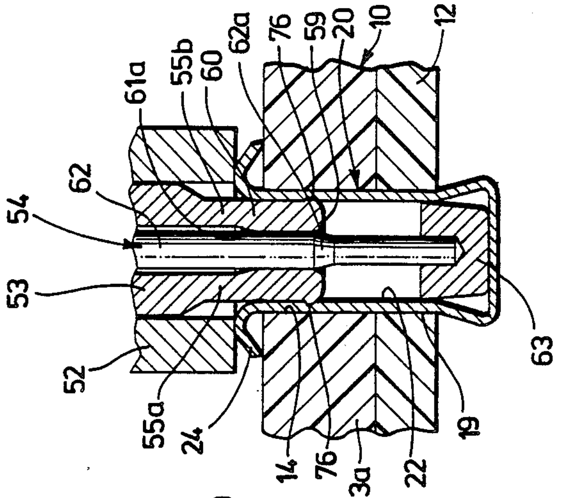
FIGS. 7, 8 and 9 illustrate the sequence of operation of the actuation tool of FIG. 5 for mounting a connector to a printed circuit board.
Figure 8:
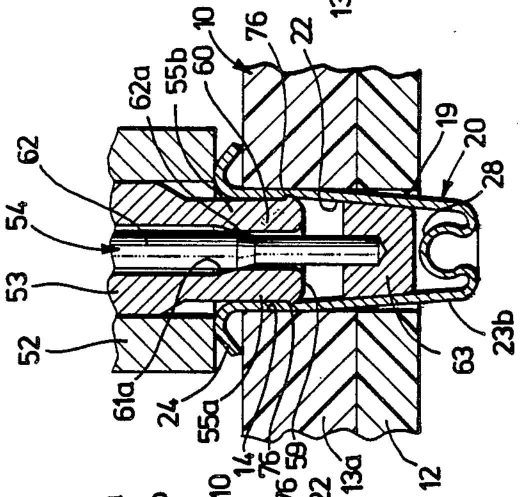
Figure 7:
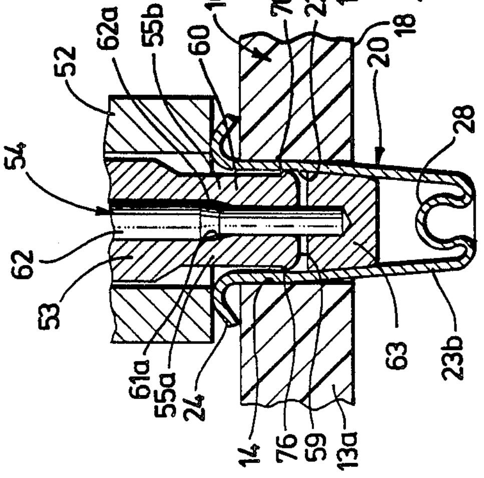

FIGS. 7–9 illustrate the sequence of operation for mounting connector 10 to printed circuit board 12 using actuation tool 50 according to the present invention. Initially, eyelets 20 are inserted into apertures 14 in connector 10 as illustrated in FIG. 2. As described above, the eyelets are preferably inserted into apertures 14 during manufacture of the connector and retained therein by an interference fit to permit the connector to be shipped and stored in pre-assembled condition until it is desired to mount the connector to a printed circuit board. As best shown in FIG. 7, when eyelet 20 is inserted into aperture 14, the tapered bottom portion 23*b* thereof extends outwardly beyond the bottom surface 18 of connector housing portion 13*a*.

To mount connector 10 to printed circuit board 12, tool 50 is first inserted into bore 22 of inverted end eyelet 20 as shown in FIG. 7 with the actuating plunger 62 in a retracted position within collet 53 such that head portion 63 is adjacent front end 59 of the collet. In its retracted position, the smaller diameter portion 54*a* of plunger 54 is within orifice 75, collet portions 55*a* and 55*b* are in a substantially unbiased position, the front end portion 60 of collet 53 and the enlarged head portion 63 of plunger 54 can be easily inserted into eyelet bore 22 and are positioned rather loosely within bore 22.

Activating plunger 54 is then pushed forwardly within bore 22 to a first, partially extended position illustrated in FIG. 8. As shown in FIG. 8, when plunger 54 is pushed forwardly, external tapered surface portion 62*a* on shaft 62 engages internal tapered surface portion 61*a* in collet aperture 61 and urges collet portions 55*a* and 55*b* radially outwardly to an expanded or biased position shown in FIG. 8. Collet portions 55*a* and 55*b* are maintained in the expanded or biased position by external tapered surface portion 62*a* being partially or completely received in orifice 75. In a preferred embodiment, portion 62*a* is received within orifice 75 and, possibly passing therethrough, with collet portions 55*a* and 55*b* maintained in the biased position by larger diameter portion 54*a* of plunger 54 being received in orifice 75. An outwardly extending barb 76 is formed adjacent the front end of each collet portion 55*a* and 55*b*, and as the collet portions are urged apart, barbs 76 engage and bite into the inner sidewall of eyelet 20. In a preferred embodiment, barbs 76 engage and bite into the inner sidewall of eyelet 20 in a region of bore 22 within aperture 14 in connector housing 13. Thus, when tool 50 is in the first, partially extended position illustrated in FIG. 8, collet 53 firmly grips eyelet 20 and securely restrains the eyelet and the connector.

Connector 10 is then positioned on printed circuit board 12. The extended tapered portion 23*b* of eyelet 20 is adapted to be extended through an aperture 19 in printed circuit board 12, and functions as a guide to facilitate proper positioning of the connector relative to the board. The tapered shape of extended eyelet portion 23*b* also helps to guide the eyelet into the proper aperture 19 in the board and permits a reduction in tolerance requirements for the board and the connector.

Figure 10:
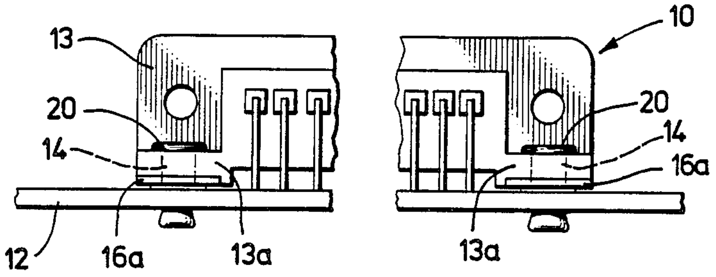
FIG. 10 is a back view of the connector of FIGS. 1 and 2 mounted to a printed circuit board.

Following positioning of the connector on the printed circuit board 12, actuating plunger 54 is pushed forwardly within bore 22 to a second, fully extended position illustrated in FIG. 9 to actuate the eyelet 20. As it is moved forwardly, the enlarged head 63 of plunger 54 contacts the inwardly domed portion 28 of eyelet 20 and deforms it as shown in FIGS. 9 and 10 causing the extended portion 23*b* of the eyelet to spread radially outwardly to attach the connector to the printed circuit board. Simultaneously, collet members 55*a* and 55*b* are maintained in the expanded or biased position by larger diameter portion 54*a* of plunger 54 in orifice 75.

Following the eyelet actuating step shown in FIG. 9, actuating plunger 54 is retracted back to its retracted position shown in FIG. 7. When the external tapered surface portion 62*a* on shaft 62 clears the internal tapered surface portion 61*a* on collet 53, smaller diameter portion 54*b* is again received in orifice 75 and portions 55*a* and 55*b* of collet 53 are released and spring inwardly to release the eyelet allowing the tool to be easily withdrawn from the eyelet.

Typically, after the eyelet is actuated to attach the connector to the printed circuit board, the eyelet is then soldered to the board during a soldering process that also solders other components stuffed into the board to provide a secure, permanent electrical and mechanical attachment of the connector to the board.

With the present invention, barbs 76 on the collet 53 firmly bite into and restrain the eyelet relative to the collet during actuation of the eyelet by the actuating plunger. In this manner all of the reactionary and axial actuation forces are transmitted from the tool 50 actuation device through plunger 54 and head portion 63 to inverted end 28 of eyelet 20 thence through the body of eyelet 20, portions 23*b* and 23*a*, to barbs 76 and collet members 55*a* and 55*b*. The actuation tool thus absorbs substantially all of the axial actuation forces required to set the inverted end of the eyelet as well as reactionary forces as a result of the actuation force and prevents axial actuation or reactionary forces from acting on the printed circuit board such as might cause the board to move, bend or break. Accordingly, with the present invention, it is not necessary to provide support tooling below the printed circuit board during actuation of the eyelet, permitting less complex, lower cost tooling to be used. Furthermore, the two-step mounting method of the invention wherein the tool initially grips and restrains the connector, and, thereafter, the connector is positioned on and attached to a printed circuit board, facilitates the assembly process by permitting the extended bottom portion of the eyelet to be used as a guide to properly position the connector relative to the printed circuit board thereby relaxing tolerance requirements.

Although tool 50 has been described as picking up a connector and positioning the connector on a printed circuit board thence setting an inverted end eyelet, the invention is not limited thereto. Tool 50 may be used to pick up and position connectors with or without eyelets in the aperture. In the absence of eyelets, tool 50 would engage the walls forming the aperture. Subsequently, securing means could be inserted into the aperture to secure the connector to the printed circuit board. The securing means could take the form of any known securing means, could include threaded devices or adhesive as well as eyelets, whether top-actuated or not, and could be inserted mechanically or manually. For example, subsequent to placing a connector having apertures but no eyelets disposed therein, a robotic arm could, in a second operation, pick up and position an eyelet in the aperture for securing the connector to a printed circuit board. If the eyelet is a top-actuated eyelet, subsequent to insertion of the eyelet, the eyelet could be set.

Figure 11:
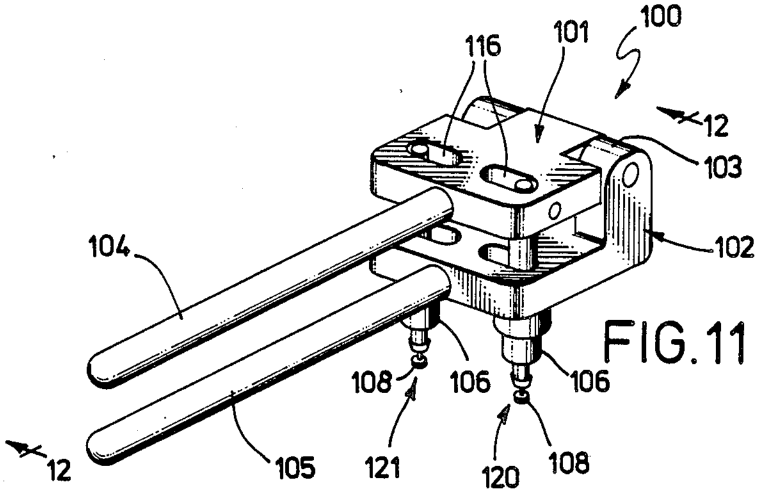
FIG. 11 schematically illustrates a hand-operated actuation tool for mounting the connector of FIGS. 1, 2 and 10 to a printed circuit board.
Figure 12:
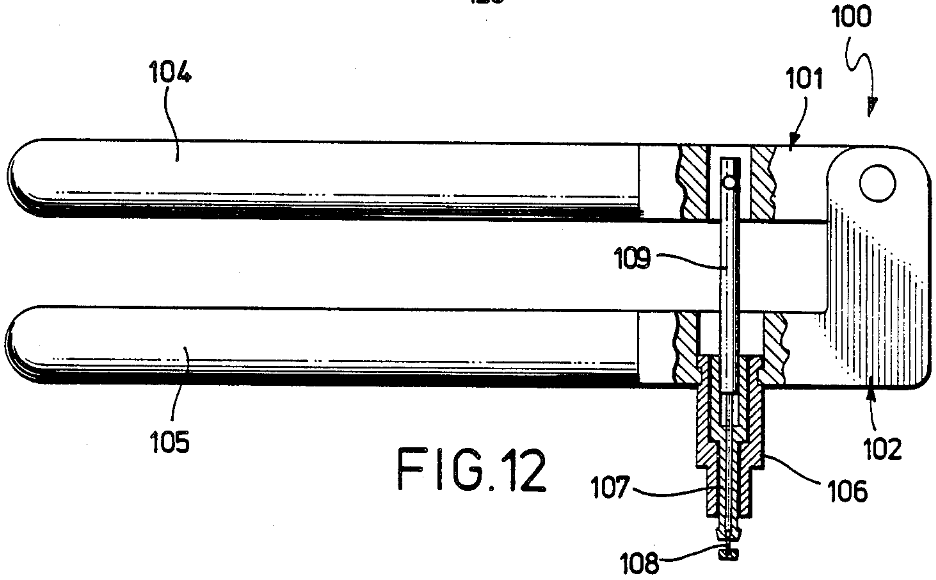
FIG. 12 is a cross-sectional view of the hand-operated actuation tool of FIG. 11 looking the direction of arrows 12—12 in FIG. 11.

The method and actuation tool of the invention are especially suitable for use in connection with robotic assembly equipment in which the actuation tool is mounted to the end of a robotic arm. The invention can also be practiced, however, with a hand-operated, manual tool, for example, in applications wherein only a few connectors are to be mounted to printed circuit boards. A suitable hand-operated tool is illustrated in FIGS. 11 and 12.

The hand-operated tool is generally designated by reference numeral !00 and comprises a first upper portion 101 and a second lower portion 102 connected together at 103 for pivotal movement of upper portion 101 relative to lower portion 102. Tool 100 contains two spaced actuation members 120 and 121 as shown in FIG. 11. The actuating members each include a holder 106 supporting a radially expandable collet 107 therein attached to lower tool portion 102, and an actuating plunger 108 attached to upper tool portion 101 via plunger extension 109. Activating plungers 108 extend through the collets 107 and are movable longitudinally therein as described with respect to the tool of FIG. 5, by pivoting upper tool portion 101 with respect to lower tool portion 102. Handles 104 and 105 extend from tool portions 101 and 102 to a assist in operating the tool.

To use hand-operated tool 100 to mount a connector such as connector 10 to a printed circuit board, the tool is first positioned relative to the connector such that actuation members 120 and !22 extend into the internal bores of the two eyelets in connector 10 while the plungers are in their retracted position, i.e., with upper tool portion 101 pivoted slightly upwardly relative to tool portion 102. Thereafter, upper tool portion 101 is pivoted downwardly by a slight amount to move the actuating plungers 108 to a first, partially extended position to expand collets 107 radially outwardly to cause barbs on the collets to grip the eyelets and to restrain the connector. The connector is then positioned with the eyelets received in corresponding apertures in a printed circuit board, and upper tool portion 101 is then pivoted further downwardly to the position shown in FIG. 12, wherein the actuating plungers 108 are moved to their second, fully extended position for actuating the eyelets in the connector to attach the connector to the board. Upper tool portion 101 is then pivoted back to its upper position to cause the actuating plungers 108 to return to their retracted position to release the connector.

Tool 100 in the preferred embodiment contains two actuation members and thus permits two eyelets to be simultaneously actuated to mount a connector having two eyelets to a printed circuit board in a single operation. The spacing between the actuation members are preferably adjustable and securable over a range as indicated by slots 116 to ensure proper alignment of the actuation members 120 and 121 with the eyelets in a variety of spacings of apertures 14 in housing 13.

While what has been described constitutes presently most preferred embodiments of the invention, it should be recognized that the invention could take numerous other forms. For example, although the actuation tool of the invention has been described herein as a means for mounting a connector to a printed circuit board, the tool is also usable as a convenient means for generally picking-up and transferring a connector from one location to another for any desired purpose during manufacture or assembly of the connector. Because the invention can take various forms, it should be understood that the invention should be limited only insofar as is required in the scope of the following claims.

What is claimed is:

1. A method for mounting an electrical connector to a support panel, comprising:

providing an electrical connector having aperture means therein, said aperture means defining wall means;

providing a tool having a radially expandable portion thereon, said radially expandable portion having barbs thereon;

inserting said radially expandable portion of said tool into said aperture means;

operating said tool to radially expand said radially expandable portion thereof until the barbs thereon engage said wall means; and positioning said connector relative to a support panel, whereby said aperture means align with an aperture in the support panel.

2. A method for mounting an electrical connector to a support panel as recited in claim 1, further comprising the step of operating said tool to return said radially expandable portion to an unexpanded condition to disengage the barbs from the wall means.

3. A method for mounting an electrical connector to a support panel as recited in claim 2, further comprising the step of withdrawing said tool from said aperture means after operating the tool to return the radially expandable portion to an unexpanded condition.

4. A method for mounting an electrical connector to a support panel as recited in claim 1 further comprising the step of securing said connector to the support panel.

5. A method for mounting an electrical connector to a support panel comprising:

providing an electrical connector having a top-actuated eyelet extending through an aperture in the connector, said eyelet having a bottom portion which extends outwardly of the aperture and an internal axial bore extending into the eyelet from the top end thereof;

inserting an actuation tool into said eyelet bore, said actuation tool including an eyelet gripping member having barbs thereon and an eyelet actuating member;

operating said eyelet gripping member until barbs thereon grip a sidewall defining the bore of said eyelet for restraining the eyelet and the connector;

positioning said connector relative to a support panel such that the extended bottom portion of said eyelet extends through an aligned aperture in said support panel; and operating said eyelet actuating member for expanding the extended bottom portion of said eyelet outwardly to attach said connector to said support panel.

6. The method of claim 5 wherein said support panel comprises a printed circuit board.

7. The method of claim 5 wherein said eyelet gripping member includes means for gripping the sidewall of said eyelet while said eyelet actuating member is operated to expand the extended bottom portion of said eyelet, whereby said tool absorbs substantially all vertical forces required to attach said connector to said support panel.

8. The method of claim 7 wherein said eyelet actuating member comprises an actuating plunger movable axially within said tool, and wherein said eyelet gripping member comprises an expandable collet surrounding said actuating plunger, said actuating plunger and said expandable collet including cooperating surface portions thereon, and wherein said step of operating said eyelet gripping member comprises moving said actuating plunger forwardly to a first, partially extended position during which said cooperating surface portion on said actuating plunger engages said cooperating surface portion on said collet for causing said expandable collet to expand radially outwardly to grip the sidewall of said eyelet.

9. The method of claim 8 wherein said step of operating said eyelet actuating member comprises moving said actuating plunger forwardly to a second, fully extended position for expanding the extended bottom portion of said eyelet outwardly to attach said connector to said support panel.

10. The method of claim 9 wherein said inserting step comprises inserting said tool into said eyelet bore when said actuating plunger is in a retracted position.

11. The method of claim 5 wherein said providing step includes the step of supporting said top-actuated eyelet in said aperture with an interference fit.

12. An actuation tool for mounting an electrical connector to support panel with a top-actuated eyelet having a bore therein defined by a sidewall, said tool comprising an actuation member including:

a tool holder;

a collet supported in said tool holder, said collet having an expandable front portion extending forwardly of said holder having barbs thereon, said collet having an axial passageway having an internal tapered surface portion thereon;

an actuating plunger extending through said collet passageway and being axially movable with said collet passageway, said plunger having a front portion extending forwardly of said collet and an external tapered surface portion within said collet; and means for operating said actuating plunger from a retracted position during which said front portions of said collet and said plunger are inserted into said top-actuated eyelet, to a first, partially extended position during which said external tapered surface portion on said plunger engages said internal tapered surface portion on said collet passageway to urge said expandable front portion of said collet into gripping engagement with the sidewall of the eyelet, to a second, fully extended position during which said front portion of said plunger actuates said eyelet to attach the connector to a support panel.

13. The tool of claim 12 wherein said expandable front portion of said collet includes first and second collet portions, separated by a longitudinal slot therebetween, each of said first and second collet portions including a barb thereon for gripping the sidewall of said eyelet when said collet is expanded.

14. The tool of claim 13 wherein said first and second collet portions are of generally semi-circular cross-section.

15. The tool of claim 12 wherein said tool includes first and second spaced actuation members for simultaneously gripping and for simultaneously actuating two top-actuated eyelets in a connector.

16. The tool of claim 15 wherein said tool comprises a hand operated tool.

17. A method for mounting an electrical connector to a support panel comprising:

providing an electrical connector having at least two top-actuated eyelets each extending through a respective aperture in the connector, each of said eyelets having a bottom portion which extends outwardly of its respective aperture and an internal axial bore extending into the eyelet from the top end thereof;

inserting an actuation tool into the axial bore of each of said eyelets, said actuation tool including first and second eyelet gripping members having barbs thereon and first and second eyelet actuating member;

simultaneously operating said first and second eyelet gripping members for simultaneously engaging said barbs to a sidewall thereby gripping the sidewall of each of said eyelets for restraining each of the eyelets and the connector; and positioning said connector relative to a support panel such that the extended bottom portions of said eyelets extend through aligned apertures in said support panel.

18. The method of claim 17 further comprising the step of simultaneously operating said first and second actuation members for expanding the extended bottom portion of said eyelets.

19. The method of claim 15 wherein said tool comprises a hand-operated tool.

20. A method for picking-up and transporting an electrical connector having at least one top-actuated eyelet supported in an aperture therein, said method comprising:

inserting a tool into said eyelet, said tool including a radially expandable eyelet gripping member having barbs thereon and an axial passageway, said passageway having an internal surface portion, and a shaft extending through said passageway and being movable axially relative to said gripping member, said shaft including an external surface portion; and moving said shaft axially relative to said gripping member from a retracted position to an extended position relative to said gripping member during which said external surface portion on said shaft engages said internal surface portion on said gripping member passageway for causing said gripping member to expand radially outwardly such that barbs thereon grip the sidewall of said eyelet and said connector whereby said connector may be picked-up and transported from one location to another by said tool.

21. The method of claim 20 and further including the step of moving said shaft axially relative to said gripping member from said extended position to said retracted position for causing said external surface portion on said shaft to release said internal surface portion on said gripping member passageway for releasing said eyelet and said connector by said tool.

* * * * *